US010425393B2

(12) United States Patent
Rong et al.

(10) Patent No.: US 10,425,393 B2
(45) Date of Patent: Sep. 24, 2019

(54) WIRELESS LOCAL AREA NETWORK WLAN ACCESS METHOD, TERMINAL, AND SERVER

(71) Applicant: Huawei Technologies Co., Ltd., Shenzhen (CN)

(72) Inventors: Guoqiang Rong, Shenzhen (CN); Jingtao Feng, Shenzhen (CN); Zijun Li, Shenzhen (CN); Wenhu Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 14/980,412

(22) Filed: Dec. 28, 2015

(65) Prior Publication Data
US 2016/0134613 A1 May 12, 2016

Related U.S. Application Data

(63) Continuation of application No. PCT/CN2014/075529, filed on Apr. 16, 2014.

(51) Int. Cl.
H04L 29/00 (2006.01)
H04L 29/06 (2006.01)
(Continued)

(52) U.S. Cl.
CPC ............ H04L 63/08 (2013.01); H04L 63/10 (2013.01); H04W 48/08 (2013.01); H04W 76/11 (2018.02); H04W 84/12 (2013.01); H04W 88/08 (2013.01)

(58) Field of Classification Search
CPC ......... H04L 63/08; H04L 63/10; H04W 48/08
(Continued)

(56) References Cited

U.S. PATENT DOCUMENTS

2003/0131082 A1* 7/2003 Kachi ................. H04L 63/0876
709/220
2005/0251681 A1* 11/2005 Robles ............... H04L 63/0853
713/172
(Continued)

FOREIGN PATENT DOCUMENTS

CN    101877901 A    11/2010
CN    102711110 A    10/2012
(Continued)

OTHER PUBLICATIONS

Foreign Communication From a Counterpart Application, European Application No. 14889330.8, Extended European Search Report dated Aug. 5, 2016, 9 pages.
(Continued)

Primary Examiner — Brandon S Hoffman
Assistant Examiner — Michael D Anderson
(74) Attorney, Agent, or Firm — Conley Rose, P.C.

(57) ABSTRACT

A wireless local area network (WLAN) access method, a terminal, and a server implement intelligentization and simplify a user operation. The method includes sending, by the terminal, a request for querying an available wireless access point to a server; sending, by the server according to the query request, obtained information about the available wireless access point; then, receiving, by the terminal, wireless access point information returned by the server, and determining a specific wireless access point from the received wireless access point information; then, sending, by the terminal, an authentication information request of the specific wireless access point to the server; and when receiving the request, sending, by the server, authentication information corresponding to the specific wireless access point to the terminal, where the authentication information
(Continued)

is used to connect the terminal to the specific wireless access point.

17 Claims, 7 Drawing Sheets

(51) Int. Cl.
    *H04W 76/11* (2018.01)
    *H04W 48/08* (2009.01)
    *H04W 84/12* (2009.01)
    *H04W 88/08* (2009.01)

(58) Field of Classification Search
    USPC .............................................................. 726/7
    See application file for complete search history.

(56) References Cited

U.S. PATENT DOCUMENTS

| 2007/0271598 | A1* | 11/2007 | Chen | H04L 63/08 |
|---|---|---|---|---|
| | | | | 726/4 |
| 2011/0081890 | A1 | 4/2011 | Ahmadvand et al. | |
| 2012/0047275 | A1 | 2/2012 | Yang et al. | |
| 2013/0322329 | A1 | 12/2013 | Visuri et al. | |

FOREIGN PATENT DOCUMENTS

| CN | 102946586 | A | 2/2013 |
|---|---|---|---|
| EP | 2372971 | A1 | 10/2011 |
| EP | 2824870 | A1 | 1/2015 |
| EP | 2887744 | A1 | 6/2015 |
| EP | 1560369 | B1 | 11/2016 |
| JP | 2005244936 | A | 9/2005 |
| JP | 2010118840 | A | 5/2010 |
| KR | 20060102183 | A | 9/2006 |
| KR | 20120085648 | A | 8/2012 |
| WO | 2013152633 | A1 | 10/2013 |
| WO | 2014047887 | A1 | 4/2014 |

OTHER PUBLICATIONS

Partial English Translation and Abstract of Chinese Patent Application No. CN102946586, Dec. 18, 2015, 6 pages.
Partial English Translation and Abstract of Chinese Patent Application No. CN102711110, Apr. 21, 2016, 4 pages.
"Part 11: Wireless LAN Medium Access Control (MAC) and Physical Layer (PHY) Specifications," IEE Computer Society, IEEE Std 802.11, Mar. 29, 2012, 2793 pages.
Foreign Communication From a Counterpart Application, PCT Application No. PCT/CN2014/075529, English Translation of International Search Report dated Jan. 26, 2015, 2 pages.
Foreign Communication From a Counterpart Application, PCT Application No. PCT/CN2014/075529, Written Opinion dated Jan. 26, 2015, 8 pages.
Machine Translation and Abstract of Korean Publication No. KR20060102183, Sep. 27, 2006, 16 pages.
Foreign Communication From a Counterpart Application, Korean Application No. 10-2016-7031594, Korean Office Action dated Jun. 16, 2017, 5 pages.
Foreign Communication From a Counterpart Application, Korean Application No. 10-2016-7031594, English Translation of Korean Office Action dated Jun. 16, 2017, 3 pages.
Machine Translation and Abstract of Japanese Publication No. JP2010118840, May 27, 2010, 25 pages.
Foreign Communication From a Counterpart Application, Japanese Application No. 2016-562893, Japanese Office Action dated Nov. 7, 2017, 4 pages.
Foreign Communication From a Counterpart Application, Japanese Application No. 2016-562893, English Translation of Japanese Office Action dated Nov. 7, 2017, 5 pages.
Foreign Communication From a Counterpart Application, Korean Application No. 10-2016-7031594, Korean Notice of Allowance and Brief Translation dated Nov. 27, 2017, 3 pages.

* cited by examiner

Main control interface    Permission type setting

WIRELESS LOCAL AREA NETWORK WLAN ACCESS METHOD, TERMINAL, AND SERVER

CROSS-REFERENCE TO RELATED APPLICATION

This application is a continuation of International Application No. PCT/CN2014/075529, filed on Apr. 16, 2014, which is hereby incorporated by reference in its entirety.

TECHNICAL FIELD

The present disclosure relates to the field of communications, and in particular, to a wireless local area network access method, a terminal, and a server.

BACKGROUND

As wireless access points are widely deployed, Internet access via a wireless local area network (WLAN) becomes an important manner of Internet access. A user manually selects, on a terminal, a wireless access point that needs to be accessed and manually enters a password to access the access point. Thereby the user may access the internet via the WLAN.

At present, when a terminal moves from one location to another location, because a surrounding wireless access point probably changes, in this case, a user generally needs to reset information related to the wireless access point for connection. That is, the user cannot connect to the WLAN before reselecting an appropriate wireless access point and re-entering a password. The resetting manner brings an operation burden to the user.

In the prior art, in order to solve the foregoing problem, the following two manners may be used for implementation.

Manner 1: Implementation in a Wi-Fi Protected Setup (WPS) manner. This manner can help a user automatically set a network name (that is, a service set identifier (SSID)) and a security secret key. When a terminal moves to a new location, because a function key is generally designed on a body of a wireless product having such a function, the user presses the function key or enters a personal identification number (PIN) code, and then performs two or three operations to implement wireless password setting and wireless connection between a client and a router.

Manner 2: Collecting a large amount of wireless access point information in advance in an application of a terminal, where the information includes a name of a wireless access point and a corresponding connection password when a connection password is set for the wireless access point. If the terminal moves to a new location, when the terminal runs the application, wireless access points surrounding the terminal at that time are displayed to a user. Then, the user manually selects, according to a requirement, a specific wireless access point for connection.

It can be seen from the foregoing that, in the foregoing two manners, manual operation steps of a user are simplified to some extent. However, in the two manners, the user needs to be involved, and the user at least needs to manually select a specific wireless access point.

SUMMARY

Embodiments of the present disclosure provide a WLAN access method, a terminal, and a server, where a user neither needs to enter a password nor needs to select a specific wireless access point, thereby simplifying a user operation.

In order to achieve the forgoing objective, the following technical solutions are used in the embodiments of the present disclosure.

A first aspect of the present disclosure provides a WLAN access method, including sending a request for querying an available wireless access point to a server, to query information about the available wireless access point; receiving wireless access point information returned by the server; determining a specific wireless access point from the received wireless access point information; and acquiring authentication information of the specific wireless access point from the server, where the authentication information is used to connect the terminal to the specific wireless access point corresponding to the authentication information.

In a first possible implementation manner of the first aspect, the request for querying the available wireless access point carries at least one of the following parameters: an area identifier, a charge rate identifier, a traffic identifier, and a duration identifier.

With reference to the first aspect or the first possible implementation manner of the first aspect, in a second possible implementation manner of the first aspect, the determining a specific wireless access point from the received wireless access point information includes determining the specific wireless access point from the wireless access point information according to a preset rule, where the preset rule is one or more of the following: a signal strength, a charge rate, and available traffic.

With reference to the first aspect or the first possible implementation manner of the first aspect or the second possible implementation manner of the first aspect, in a third possible implementation manner of the first aspect, before the determining a specific wireless access point from the received wireless access point information, the method further includes sending a connection permission application request to the server, where the connection permission application request is used to request the server to determine whether the terminal has a connection permission; in a case of having the connection permission, receiving a permission allocation result sent by the server; and the determining a specific wireless access point from the received wireless access point information includes determining the specific wireless access point from the wireless access point information according to the received permission allocation result.

With reference to the third possible implementation manner of the first aspect, in a fourth possible implementation manner of the first aspect, a parameter carried in the connection permission application request includes a terminal identifier; or a user identifier; or a terminal identifier, a permission application type, and a permission value corresponding to the permission application type; or a user identifier, a permission application type, and a permission value corresponding to the permission application type.

With reference to the fourth possible implementation manner of the first aspect, in a fifth possible implementation manner of the first aspect, after the terminal is connected to the specific wireless access point, the method further includes sending permission usage information to the server, where the permission usage information includes the terminal identifier and consumed permission information, or the user identifier and consumed permission information; receiving unused permission information sent by the server, where the unused permission information is obtained by the server by performing processing according to a permission allocated to the terminal and the permission usage information; and acquiring the unused permission information sent by the server, and when the unused permission information is that the permission corresponding to the terminal is already exhausted, disconnecting the terminal from the specific wireless access point.

With reference to the first aspect or any implementation manner in the foregoing possible implementation manners of the first aspect, in a sixth possible implementation manner of the first aspect, the acquiring authentication information of the specific wireless access point from the server, where the authentication information is used to connect the terminal to the specific wireless access point corresponding to the authentication information includes sending an authentication information request of the specific wireless connection point to the server; and receiving the authentication information that is corresponding to the specific wireless access point and sent by the server; and the method further includes sending the received authentication information to the specific wireless access point, to apply for authentication; and receiving an authentication result sent by the specific wireless access point, where if the authentication result is that the authentication is successful, the terminal connects to a network using the specific wireless access point.

A second aspect of the present disclosure provides a WLAN access method, including receiving a request that is for querying an available wireless access point and sent by a terminal; obtaining information about the available wireless access point according to the query request, and sending the obtained information about the available wireless access point to the terminal; and when an authentication information request of a specific wireless access point is received from the terminal, sending authentication information corresponding to the specific wireless access point to the terminal, where the authentication information is used to connect the terminal to the specific wireless access point.

In a first possible implementation manner of the second aspect, the request for querying the available wireless access point carries at least one of the following parameters: an area identifier, a charge rate identifier, a traffic identifier, and a duration identifier.

With reference to the second aspect or the first possible implementation manner of the second aspect, in a second possible implementation manner of the second aspect, after the sending the obtained wireless access point information to the terminal, the method further includes receiving a connection permission application request sent by the terminal; determining, according to the received request, whether the terminal can be allocated a connection permission; and when it is determined that the terminal can be allocated a connection permission, sending a permission allocation result to the terminal.

With reference to the second possible implementation manner of the second aspect, in a third possible implementation manner of the second aspect, a parameter carried in the connection permission application request includes a terminal identifier; or a user identifier; or a terminal identifier, a permission application type, and a permission value corresponding to the permission application type; or a user identifier, a permission application type, and a permission value corresponding to the permission application type.

With reference to the second possible implementation manner of the second aspect or the third possible implementation manner of the second aspect, in a fourth possible implementation manner of the second aspect, after the terminal is connected to the specific wireless access point, the method further includes receiving permission usage information sent by the terminal, where the permission usage information includes the terminal identifier and consumed permission information, or the user identifier and consumed permission information; performing processing according to a permission allocated to the terminal and the permission usage information to obtain unused permission information of the terminal; and sending the unused permission information to the terminal, where the unused permission information is used by the terminal to determine whether to keep connected to the specific wireless access point.

With reference to the second aspect or any implementation manner in the foregoing possible implementation manners of the second aspect, in a fifth possible implementation manner of the second aspect, before the sending authentication information corresponding to the specific wireless access point to the terminal, the method further includes acquiring wireless connection authentication information from at least one WLAN service provider.

With reference to the fifth possible implementation manner of the second aspect, in a sixth possible implementation manner of the second aspect, the acquiring wireless connection authentication information from at least one WLAN service provider includes sending, to the at least one WLAN service provider, a request for applying for connection authentication information; receiving authentication information provided by the WLAN service provider; and storing the received authentication information.

With reference to the sixth possible implementation manner of the second aspect, in a seventh possible implementation manner of the second aspect, the request for applying to the WLAN service provider for connection authentication information carries an amount of connection authentication information that is applied for and at least one of the following parameters: an area identifier, used to identify an area to which a wireless connection point belongs; a charge rate identifier, used to identify a rate type to which the connection authentication information that is applied for belongs; a traffic identifier, used to identify traffic to which the connection authentication information that is applied for belongs; and a duration identifier, used to identify duration corresponding to the connection authentication information that is applied for.

A third aspect of the present disclosure provides a terminal, including a sending unit configured to send a request for querying an available wireless access point to a server, to query information about the available wireless access point; a receiving unit configured to receive wireless access point information returned by the server; a processing unit configured to determine a specific wireless access point from the wireless access point information received by the receiving unit; and a connecting unit configured to acquire authentication information of the specific wireless access point from the server, where the authentication information is used to connect the terminal to the specific wireless access point corresponding to the authentication information.

With reference to the third aspect, in a first possible implementation manner of the third aspect, the processing unit is configured to determine the specific wireless access point from the wireless access point information according to a preset rule, where the preset rule is one or more of the following: a signal strength, a charge rate, and available traffic.

With reference to the third aspect or the first possible implementation manner of the third aspect, in a second possible implementation manner of the third aspect, the sending unit is further configured to, before the specific wireless access point is determined from the received wireless access point information, send a connection permission application request to the server, where the connection permission application request is used to request the server to determine whether the terminal has a connection permission; in a case of having the connection permission, the receiving unit is further configured to receive a permission allocation result sent by the server; and that the processing unit determines a specific wireless access point from the wireless access point information received by the receiving unit includes determining the specific wireless access point from the wireless access point information according to the permission allocation result received by the receiving unit.

With reference to the second possible implementation manner of the third aspect, in a third possible implementation manner of the third aspect, the sending unit is further configured to, after the terminal is connected to the specific wireless access point, send permission usage information to the server, where the permission usage information includes a terminal identifier and a value of consumed permission; or a user identifier and consumed permission information; the receiving unit is further configured to receive unused permission information sent by the server, where the unused permission information is obtained by the server by performing processing according to a permission allocated to the terminal and the permission usage information; and the processing unit is further configured to acquire the unused permission information sent by the server, and when the unused permission information is that the permission corresponding to the terminal is already exhausted, disconnect the terminal from the specific wireless access point.

With reference to the third aspect or the first possible implementation manner of the third aspect or the second possible implementation manner of the third aspect or the third possible implementation manner of the third aspect, in a fourth possible implementation manner of the third aspect, the connecting unit includes an authentication information querying module configured to send, to the server, an authentication information request corresponding to the specific wireless connection point; an authentication information receiving module configured to receive the authentication information that is of the specific wireless access point and sent by the server; an authentication application sending module configured to send the received authentication information to the specific wireless access point, to apply for authentication; and an authentication result receiving module configured to receive an authentication result of the authentication information from the specific wireless access point, where if the authentication result is that the authentication is successful, the terminal connects to a network using the specific wireless access point.

A fourth aspect of the present disclosure provides a server, including a receiving unit configured to receive a request that is for querying an available wireless access point and sent by a terminal; and a sending unit configured to obtain information about the available wireless access point according to the query request, and send the acquired information about the wireless access point to the terminal, where, when the receiving unit receives an authentication information request of a specific wireless access point from the terminal, the sending unit is further configured to send authentication information corresponding to the specific wireless access point to the terminal, where the authentication information is used to connect the terminal to the specific wireless access point.

With reference to the fourth aspect, in a first possible implementation manner of the fourth aspect, the receiving unit is further configured to receive a connection permission application request sent by the terminal; and the server further includes a processing unit configured to determine, according to the request received by the receiving unit, whether the terminal can be allocated a connection permission; and the sending unit is further configured to, when it is determined that the terminal can be allocated a connection permission, send a permission allocation result to the terminal.

With reference to the first possible implementation manner of the fourth aspect, in a second possible implementation manner of the fourth aspect, the receiving unit is further configured to receive permission usage information sent by the terminal, where the permission usage information includes a terminal identifier and a value of consumed permission; or a user identifier and consumed permission information; the processing unit is further configured to perform processing according to a permission allocated to the terminal and the permission usage information to obtain unused permission information of the terminal; and the sending unit is further configured to send the unused permission information to the terminal, where the unused permission information is used by the terminal to determine whether the terminal keeps connected to the specific wireless access point.

With reference to the fourth aspect or the first possible implementation manner of the fourth aspect or the second possible implementation manner of the fourth aspect, in a third possible implementation manner of the fourth aspect, the server further includes an acquiring unit configured to acquire wireless connection authentication information from at least one WLAN service provider.

With reference to the third possible implementation manner of the fourth aspect, in a fourth possible implementation manner of the fourth aspect, the acquiring unit is configured to send, to the at least one WLAN service provider, a request for applying for connection authentication information; receive authentication information provided by the WLAN service provider; and store the received authentication information.

A fifth aspect of the present disclosure provides a terminal, including a sender configured to send a request for querying an available wireless access point to a server, to query information about the available wireless access point; a receiver configured to receive wireless access point information returned by the server; storage configured to store the wireless access point information received by the receiver; and a processor configured to determine a specific wireless access point from the wireless access point information stored in the storage, where the processor is further configured to acquire authentication information of the specific wireless access point from the server, where the authentication information is used to connect the terminal to the specific wireless access point corresponding to the authentication information.

With reference to the fifth aspect, in a first possible implementation manner of the fifth aspect, the processor is configured to determine the specific wireless access point from the wireless access point information according to a preset rule, where the preset rule is one or more of the following: a greatest signal strength, a lowest charge rate, and maximum available traffic.

With reference to the fifth aspect or the first possible implementation manner of the fifth aspect, in a second possible implementation manner of the fifth aspect, the sender is further configured to, before the processor determines the specific wireless access point according to the wireless access point information, send a connection permission application request to the server, where the connection permission application request is used to request the server to determine whether the terminal has a connection permission; in a case of having the connection permission, the receiver is further configured to receive a permission allocation result sent by the server; and that the processor determines a specific wireless access point from the wireless access point information stored in the storage includes that the processor determines, according to the received permission allocation result, the specific wireless access point from the wireless access point information stored in the storage.

With reference to the second possible implementation manner of the fifth aspect, in a third possible implementation manner of the fifth aspect, the sender is further configured to send permission usage information to the server, where the permission usage information includes a terminal identifier and a value of consumed permission; or a user identifier and consumed permission information; the receiver is further configured to receive unused permission information sent by the server, where the unused permission information is obtained by the server by performing processing according to a permission allocated to the terminal and the permission usage information; and the processor is further configured to acquire the unused permission information sent by the server, and when the unused permission information is that the permission corresponding to the terminal is already exhausted, disconnect the terminal from the specific wireless access point.

With reference to the fifth aspect or the first possible implementation manner of the fifth aspect or the second possible implementation manner of the fifth aspect or the third possible implementation manner of the fifth aspect, in a fourth possible implementation manner of the fifth aspect, the sender is further configured to send, to the server, an authentication information request corresponding to the specific wireless connection point; the receiver is further configured to receive the authentication information that is of the specific wireless access point and sent by the server; the sender is further configured to send the received authentication information to the specific wireless access point, to apply for authentication; and the receiver is further configured to receive an authentication result of the authentication information from the specific wireless access point, where if the authentication result is that authentication is successful, the terminal connects to a network using the specific wireless access point.

A sixth aspect of the present disclosure provides a server, including a receiver configured to receive a request that is for querying an available wireless access point and sent by a terminal; a processor configured to obtain information about the available wireless access point according to the query request; and a sender configured to send the acquired information about the wireless access point to the terminal, where the sender is further configured to, when the receiver receives an authentication information request of a specific wireless access point from the terminal, send authentication information corresponding to the specific wireless access point to the terminal, where the authentication information is used to connect the terminal to the specific wireless access point.

With reference to the sixth aspect, in a first possible implementation manner of the sixth aspect, the receiver is further configured to, after the sender sends the acquired information about the wireless access point to the terminal, receive a connection permission application request sent by the terminal; the processor is further configured to determine, according to the request received by the receiver, whether the terminal can be allocated a connection permission; and the sender is further configured to, when the processor determines that the terminal can be allocated a connection permission, send a permission allocation result to the terminal.

With reference to the first possible implementation manner of the sixth aspect, in a second possible implementation manner of the sixth aspect, the receiver is further configured to receive permission usage information sent by the terminal, where the permission usage information includes a terminal identifier and a value of consumed permission; or a user identifier and consumed permission information; the processor is further configured to perform processing according to a permission allocated to the terminal and the permission usage information to obtain unused permission information of the terminal; and the sender is further configured to send the unused permission information to the terminal, where the unused permission information is used by the terminal to determine whether the terminal keeps connected to the specific wireless access point.

With reference to the sixth aspect or the first possible implementation manner of the sixth aspect or the second possible implementation manner of the sixth aspect, in a third possible implementation manner of the sixth aspect, the processor is further configured to acquire wireless connection authentication information from at least one WLAN service provider.

With reference to the third possible implementation manner of the sixth aspect, in a fourth possible implementation manner of the sixth aspect, the processor is configured to send, by the processor, an instruction to the sender, to instruct the sender to send, to the at least one WLAN service provider, a request for applying for connection authentication information; and send, by the processor, an instruction to the receiver, to instruct the receiver to receive authentication information provided by the WLAN service provider; and the server further includes storage configured to store the received authentication information.

The WLAN access method, the terminal, and the server are provided in the present disclosure. The method includes first, the terminal sends a request for querying an available wireless access point to a server, to query information about the available wireless access point; the server receives the query request and sends, according to the query request, obtained information about the available wireless access point to the terminal; then, the terminal receives wireless access point information returned by the server, and determines a specific wireless access point from the received wireless access point information; then, the terminal sends an authentication information request of the specific wireless access point to the server; and when receiving the request, the server sends authentication information corresponding to the specific wireless access point to the terminal, where the authentication information is used to connect the terminal to the specific wireless access point. It can be seen from the foregoing that the specific wireless access point is determined from the wireless access point information returned by the server, and this manner avoids a problem that, when the wireless access point changes, a user needs to perform a manual operation to select a wireless access point from multiple wireless access points. Therefore, this manner is more intelligent and further simplifies a user operation.

BRIEF DESCRIPTION OF DRAWINGS

To describe the technical solutions in the embodiments of the present disclosure or in the prior art more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
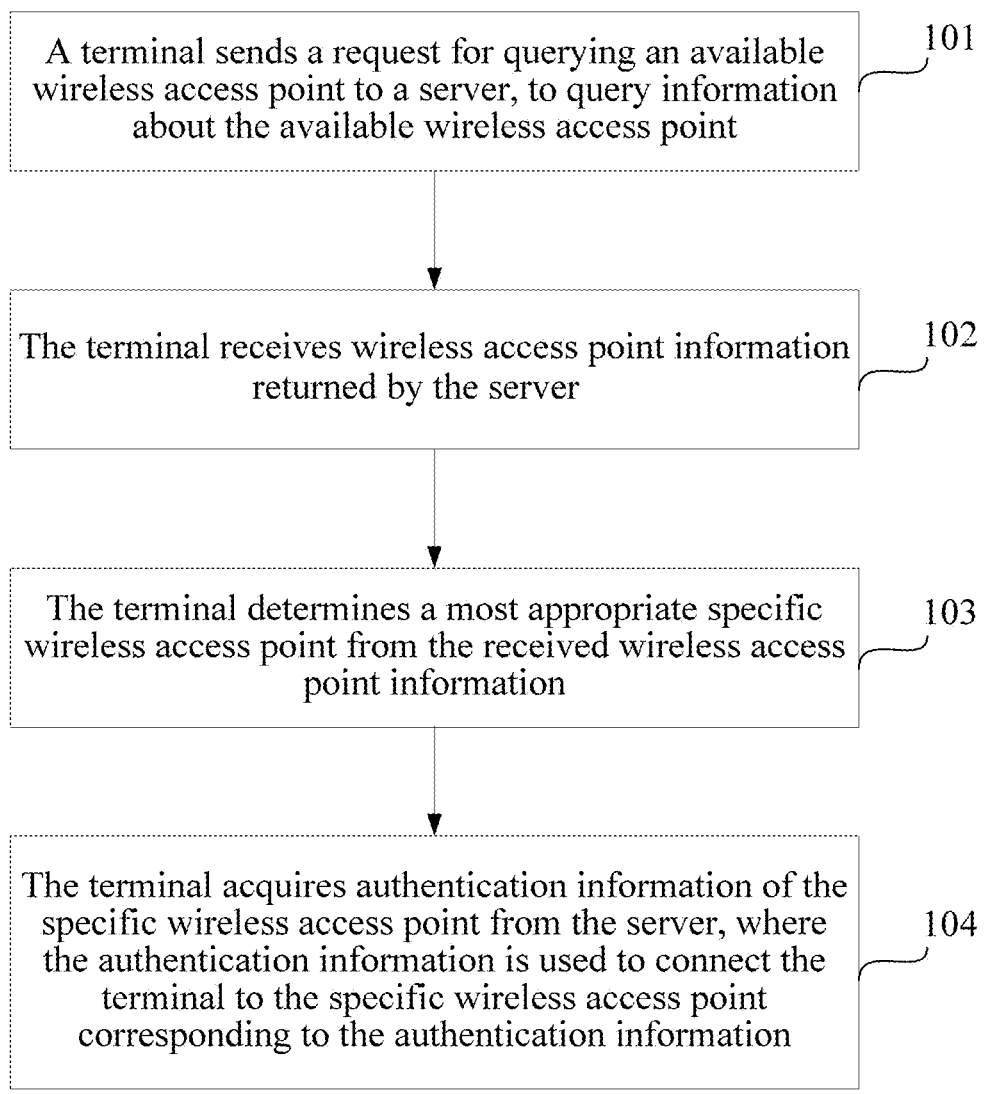
FIG. 1 is a schematic flowchart of a WLAN access method according to Embodiment 1 of the present disclosure.

Embodiment 1 of the present disclosure provides a WLAN access method, which is applied to a terminal. The terminal may be a mobile phone, a notebook computer, a tablet computer, a personal digital assistant, or any mobile device that has a function of accessing a WLAN. As shown in FIG. 1, the method includes the following steps.

101: A terminal sends a request for querying an available wireless access point to a server, to query information about the available wireless access point.

Because a wireless local area network features regionality, when the terminal is located in different geographic locations, a wireless access point in an environment surrounding the terminal also changes. Therefore, in this step, when a user starts WLAN access on the terminal, the terminal sends the request for querying an available wireless access point to the server, to query the information about the available wireless access point. Wireless access point information includes at least one wireless access point identifier. The wireless access point identifier is generally represented by an SSID, and is used to differentiate wireless access points.

Wireless access points near the environment in which the terminal is located are not necessarily managed by a server associated with the terminal. Therefore, step 101 may be that the terminal sends the request for querying an available wireless access point to the server, to query a wireless access point managed by the server.

For example, after the user starts WLAN access, and when the terminal detects that a geographical location in which the terminal is located changes, the terminal sends the query request to the server, to query the wireless access point managed by the server. For another example, as long as the terminal detects that the geographical location in which the terminal is located changes, the terminal sends, to the server, the request for querying the available wireless access point managed by the server. A condition for triggering the terminal to send the query request is not specifically limited in the present disclosure.

Optionally, in this step, the request for querying the available wireless access point may carry at least one of the following parameters: an area identifier, a charge rate identifier, a traffic identifier, and a duration identifier. When the query request sent by the terminal to the server carries the foregoing parameters, the server finds a matched wireless access point according to a parameter condition. The area identifier is used to identify an area range to which the wireless connection point belongs as required in the query request sent by the terminal to the server. For example, it is required that the wireless connection point is located within a range of 30 meters from a terminal location. The terminal location may be represented in a form, such as latitude and longitude, a geographic name, and a building name. The charge rate identifier is used to identify a charge rate type to which the wireless connection point belongs as required in the query request sent by the terminal to the server. The traffic identifier is used to identify a traffic type to which the wireless connection point belongs as required in the query request sent by the terminal to the server. The duration identifier is used to identify a minimum usage time of the wireless connection point as required in the query request sent by the terminal to the server.

It can be understood that a parameter carried in the query request sent by the terminal to the server includes but is not limited to the foregoing parameters.

The request for querying the available wireless access point may carry no parameter. For example, when the query request sent by the terminal to the server does not carry any parameter, the server provides the terminal with all wireless access points managed by the server.

102: The terminal receives wireless access point information returned by the server.

In this step, when the server receives the request for querying the available wireless access point from the terminal, the server returns, according to the request, corresponding wireless access point information. It can be understood that, when the wireless access point information includes multiple wireless access points, the wireless access points may form a wireless access point list and are returned by the server to the terminal in a list form. That is, the wireless access point information returned by the server and received by the terminal is the wireless access point list.

Optionally, when step 101 is that the terminal sends the request for querying an available wireless access point to the server, to query the wireless access point managed by the server, correspondingly, step 102 is that, after the server obtains, by querying, and sends information about wireless access points managed by the server, the terminal receives the wireless access point information returned by the server.

It can be understood that, after step 102, a step of storing, by the terminal, the received wireless access point information may further be included.

103: The terminal determines a specific wireless access point from the received wireless access point information.

The specific wireless access point represents a wireless access point, and preferably, the access point may be a most appropriate wireless access point. In some cases, the access point may also be a second appropriate wireless access point, which is not specifically limited in the present disclosure.

Optionally, in an embodiment of the present disclosure, step 103 may include determining the specific wireless access point from the received wireless access point information according to a preset rule, where the preset rule is one or more of the following: a signal strength, a charge rate, available traffic, and the like. The user may choose to set the preset rule according to a requirement of the user. For example, when the user learns that a WLAN in an area in which the terminal is located is charged, the rule may be set to a "charge rate", and the terminal determines a wireless access point with a lowest charge rate from the received wireless access point information. For another example, in order to obtain a good and long-term valid Internet access environment, the user may set the rule to signal strength and available traffic, and the terminal determines a wireless access point with a strongest signal strength and most available traffic from the received wireless access point information.

It should be noted that the foregoing preset rule may be the same as a type of a parameter carried in the foregoing request, sent by the terminal to the server, for querying the available wireless access point. For example, in a case in which a default setting is used in a system and not manually modified, when the type of the parameter carried in the request, sent by the terminal to the server, for querying the available wireless access point is the traffic identifier, the preset rule is the available traffic by default. In addition, the two may also be different, and this may be set according to a condition by the user, which is not limited in the present disclosure.

In addition, in a common case, a WLAN service provider (namely, an operator that provides a WLAN service) charges for a WLAN provided to the user, and from a perspective of the WLAN service provider, proper allocation of network resources helps reduce costs. Different network resources are generally allocated to different users by means of allocating different network permissions. Permission allocation may use such a policy: more networks are used, a higher permission is allocated. For example, duration and traffic that a terminal A uses a network are greater than duration and traffic that a terminal B uses a network, and then a permission allocated to the terminal A is higher than a permission allocated to the terminal B, that is, the terminal A obtains longer duration and more traffic than the terminal B. This policy can not only meet requirements of different users but also properly allocate the network resources, thereby effectively reducing costs of the WLAN service provider.

Considering the foregoing case in which the server allocates a permission to the terminal before the terminal is connected to a network, optionally, in an embodiment of the present disclosure, before step 103, the method further includes the following steps.

First, the terminal sends a connection permission application request to the server, where the connection permission application request is used to request the server to determine whether the terminal has a connection permission. Then, in a case of having the connection permission, the terminal receives a permission allocation result sent by the server.

In this case, step 103 includes that the terminal determines the specific wireless access point from the wireless access point information according to the received permission allocation result.

More specifically, after the terminal sends the connection permission application request to the server, if the server determines that the terminal has the connection permission, the server allocates a permission to the terminal; after the server sends the permission allocation result to the terminal, the terminal receives the permission allocation result sent by the server; and then the terminal determines the specific wireless access point from the wireless access point information according to the permission allocation result. For example, the server allocates 100 megabit traffic to a wireless access point A and allocates 50 megabit traffic to a wireless access point B, and the server returns the foregoing information to the terminal. Then, the terminal may preferably select, according to the foregoing information, the wireless access point A with more traffic for connection.

The connection permission application request may carry parameters in the following four forms, to apply to the server for the connection permission.

Form 1: The connection permission application request carries a terminal identifier.

Form 2: The connection permission application request carries a user identifier.

Form 3: The connection permission application request carries a terminal identifier, a permission application type, and a permission value corresponding to the permission application type, where the permission type includes traffic, connection duration, a charge, and the like.

Form 4: The connection permission application request carries a user identifier, a permission application type, and a permission value corresponding to the permission application type, where the permission type includes traffic, connection duration, a charge, and the like.

In the foregoing form 1, a terminal is used as a unit in this manner, that is, when the terminal requests the connection permission from the server, and the terminal reports the terminal identifier to the server. In this way, the server may allocate the permission according to the terminal identifier. In addition, only the terminal identifier is carried, and therefore, the server allocates the permission according to a policy of the server. An allocation policy may be the aforementioned policy "more networks are used, a higher permission is allocated". For example, in a case in which the permission type is the traffic, if the terminal uses more traffic of a cellular network provided by the operator, the operator rewards the terminal with more WLAN traffic.

In the foregoing form 2, a user is used as a unit in this manner, and this manner is applicable to a scenario in which a same user uses multiple terminals. The user needs to register with the server to establish a binding relationship between the user identifier and a terminal identifier. When a terminal applies for a connection permission, the user identifier needs to be carried. In addition, only the user identifier is carried, and therefore, the server allocates the permission according to a policy of the server. An allocation policy may be the aforementioned policy "more networks are used, a higher permission is allocated".

In the foregoing form 3, a terminal is used as a unit in this manner, that is, when the terminal requests the connection permission from the server, the terminal reports the terminal identifier to the server. In this way, the server may allocate the permission according to the terminal identifier. In addition, besides the terminal identifier that is carried, the permission application type and the permission value corresponding to the permission application type are further carried. In this case, the server determines whether the permission type and the permission value corresponding to the permission type that are of the permission applied for by the terminal are within an allocation range. If the permission type and the corresponding permission value that are of the permission applied for by the terminal are within the allocation range, the server allocates a corresponding permission to the terminal; and if the permission type and the corresponding permission value that are of the permission applied for by the terminal are not within the allocation range, the server provides, according to an allocation policy of the server, an allocable permission to the terminal.

In the foregoing form 4, a user is used as a unit in this manner, and this manner is applicable to a scenario in which a same user uses multiple terminals. The user needs to register with the server to establish a binding relationship between the user identifier and a terminal identifier. In this way, when a terminal applies for a connection permission, only the user identifier needs to be carried. In addition, besides the user identifier that is carried, the permission application type and the permission value corresponding to the permission application type are further carried. In this case, the server determines whether the permission type and the permission value corresponding to the permission type that are of the permission applied for by the terminal are within an allocation range. If the permission type and the corresponding permission value that are of the permission applied for by the terminal are within the allocation range, the server allocates a corresponding permission to the terminal; and if the permission type and the corresponding permission value that are of the permission applied for by the terminal are not within the allocation range, the server provides, according to an allocation policy of the server, an allocable permission to the terminal.

The following uses an example to describe how the terminal sends a permission application request carrying a parameter and how the server allocates a WLAN access service permission to the terminal according to a permission request. For example, parameters carried in a connection permission request are a terminal identifier and connection duration. First, the terminal collects statistics about duration that the terminal uses a cellular network for data communication within a specific period of time. For example, duration that the terminal uses the cellular network in five days before a current day of statistics collection is one hour. Then, the terminal sends a permission request to the server according to a duration result obtained through statistics collection, where the request carries a cellular network usage status within the specific period of time, for example, a start date is a first day, an end date is a fifth day, and the duration is 1 hour. The server determines, according to the foregoing received information, whether the permission request is within an allocation range. If it is determined that the permission request is within the allocation range, the terminal is allocated a WLAN access permission with same duration, and the allocation result is returned to the terminal.

If it is determined that the permission request is not within the allocation range, the server sends prompt information being "incomformity" to the terminal, and sends, to the terminal according to an allocation policy of the server, information for confirming whether a permission is allocated in this way. After the terminal sends confirmation, the server allocates the permission to the terminal.

Figure 2:
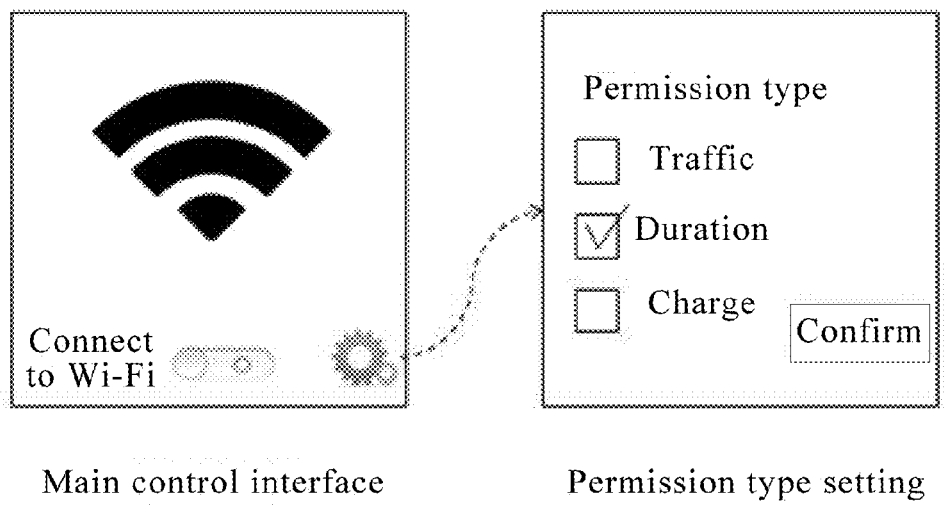
FIG. 2 is an exemplary schematic diagram of an interface of a WLAN access method according to Embodiment 1 of the present disclosure.

As shown in FIG. 2, this embodiment of the present disclosure further provides a display interface for permission connection. In a main control interface shown in FIG. 2, when a switch is in an "on" state, a signal strength icon may use a color or shape to identify that the terminal is connected to a wireless access point. For example, the signal strength icon turns green and a quantity of bars is displayed dynamically to show a signal strength. When the switch is in an "off" state, the signal strength icon may use another color or shape to identify that the connection is ended, for example, the signal strength icon turns grey and is in a static state. In addition, on the interface, there is also a configuration button that is used to set a permission type. After the user clicks the configuration button, another new interface can be displayed to the user, namely, a permission type setting interface shown in FIG. 2. On the interface, there may be three permission types, and the user may select one or more types in the three types according to a requirement. After the user selects a permission type, the terminal collects statistics about data corresponding to the permission type, and sends the data to the server, to apply for a corresponding permission.

104: The terminal acquires authentication information of the specific wireless access point from the server, where the authentication information is used to connect the terminal to the specific wireless access point corresponding to the authentication information.

Optionally, in an embodiment of the present disclosure, step 104 may include the following steps.

1041: The terminal sends, to the server, an authentication information request corresponding to the specific wireless connection point.

In a process in which the terminal requests, from the server, the authentication information corresponding to the specific wireless access point, a wireless access point identifier and the terminal identifier; or a wireless access point identifier and the user identifier may be carried.

1042: The terminal receives the authentication information that is corresponding to the specific wireless access point and sent by the server.

The authentication information may be a password, or may be a combination of "user name-password".

In this case, the method further includes the following steps.

1043: The terminal sends the received authentication information to the specific wireless access point, to apply for authentication.

For example, the terminal sends a user name being "User1" and password being "Vvvv" to a wireless access point AP1, to apply for authentication.

1044: The terminal receives an authentication result sent by the specific wireless access point, where if the authentication result is that the authentication is successful, the terminal connects to a network using the specific wireless access point.

More specifically, when the terminal receives an authentication result sent by the specific wireless access point AP1, and if the authentication result is that the authentication is successful, the terminal connects to the network using the specific wireless access point AP1.

In addition, before step 103, a step of applying to the server for a connection permission by the terminal is further included. The terminal sends a connection permission application request to the server, where the connection permission application request is used to request the server to determine whether the terminal has the connection permission. In a case of having the connection permission, the terminal receives a permission allocation result sent by the server. Therefore, the terminal determines the specific wireless access point in wireless access point information according to the received permission allocation result. That is, the server allocates a permission to the terminal according to the request, and when the permission is successfully allocated, the terminal may connect to the specific wireless access point. In this case, the terminal needs to report a permission usage status to the server. Therefore, after the terminal is connected to the specific wireless access point, the method further includes the following steps.

First, the terminal sends permission usage information to the server. The permission usage information includes the terminal identifier and consumed permission information, or the user identifier and consumed permission information.

The permission usage permission is corresponding to "a parameter carried in the connection permission application request" described above. That is, when a terminal is used as a unit, the permission usage information includes the terminal identifier and the consumed permission information; when a user is used as a unit, the permission usage information includes the user identifier and the consumed permission information. In addition, the permission usage information may further include the wireless access point identifier, authentication information (for example, a user name), and the like.

Then, the terminal receives unused permission information sent by the server, where the unused permission information is obtained by the server by performing processing according to a permission allocated to the terminal and the permission usage information.

The unused permission information is obtained by the server by performing processing according to the permission allocated to the terminal and the permission usage information. That is, the unused permission information of the terminal includes the terminal identifier and unconsumed permission information; or the user identifier and unconsumed permission information. The unconsumed permission information may be represented by a value, where the value equals to a value obtained by subtracting a value of a used permission from a value of an allocated permission. For example, the value corresponding to the permission allocated to the terminal is 1 hour, the value corresponding to the used permission is 0.8 hour, and the value corresponding to the unused permission information is 0.2 hour.

Then, the terminal acquires the unused permission information sent by the server, and when the unused permission information is that the permission corresponding to the terminal is already exhausted, the terminal is disconnected from the specific wireless access point.

The WLAN access method provided in Embodiment 1 of the present disclosure is applied to a terminal. First, the terminal sends a request for querying an available wireless access point to a server, to query information about the available wireless access point; then, the terminal receives wireless access point information returned by the server, and determines a specific wireless access point from the wireless access point information; then, the terminal acquires authentication information of the specific wireless access point from the server, where the authentication information is used to connect the terminal to the specific wireless access point corresponding to the authentication information. It can be seen from the foregoing that the terminal determines the specific wireless access point from the received wireless access point information returned by the server, and this manner avoids a problem that when the wireless access point changes, a user needs to perform a manual operation to select a wireless access point from multiple wireless access points. Therefore, this manner is more intelligent and can further simplify a user operation.

Embodiment 2

Figure 3:
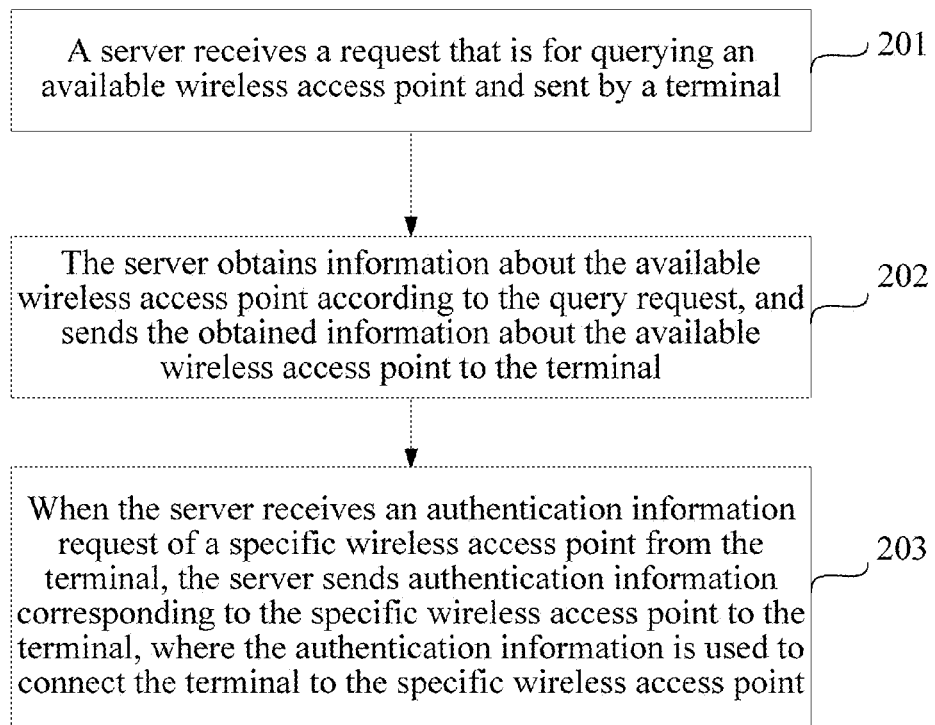
FIG. 3 is a schematic flowchart of a WLAN access method according to Embodiment 2 of the present disclosure.

Embodiment 2 of the present disclosure provides a WLAN access method, which is applied to a server. As shown in FIG. 3, the method includes the following steps.

201: A server receives a request that is for querying an available wireless access point and sent by a terminal.

Because a wireless local area network features regionality, when the terminal is located in different geographic locations, a wireless access point in an environment surrounding the terminal also changes. Therefore, in this step, when a user starts WLAN access on the terminal, the server receives the request that is for querying the available wireless access point and sent by the terminal. The query request is used to query information about the available wireless access point.

Wireless access points near the environment in which the terminal is located are not necessarily managed by a server that is associated with the terminal. Therefore, the server receives the query request sent by the terminal, where the query request is used to query a wireless access point managed by the server.

Optionally, the request for querying the available wireless access point may carry at least one of the following parameters: an area identifier, a charge rate identifier, a traffic identifier, and a duration identifier. Represented meanings of the three parameters are the same as those described in Embodiment 1, and are not repeatedly described herein.

It can be understood that the request for querying the available wireless access point may carry no parameter. For example, when the query request sent by the terminal to the server does not carry any parameter, the server may provide the terminal with all wireless access points managed by the server.

202: The server obtains information about the available wireless access point according to the query request, and sends the obtained information about the available wireless access point to the terminal.

More specifically, the server obtains, by querying according to the query request, the information about the available wireless access point from storage of the server, and sends, to the terminal, the information that is of the available wireless access point and obtained by querying. The available wireless access point information includes at least one wireless access point identifier, where the identifier is used to differentiate different wireless access points.

Considering that, in a common case, a WLAN service provider charges for a WLAN provided to the user, on a basis of meeting a user requirement, proper allocation of network resources helps reduce costs. Different network resources are generally allocated to different users by means of allocating different network permissions. Permission allocation may use such a policy: more cellular networks are used, a higher WLAN access permission is allocated. This policy can not only meet requirements of different users but also properly allocate the network resources, thereby effectively reducing costs of the WLAN service provider.

Based on a case in which the server allocates a permission to the terminal before the terminal is connected to a network, optionally, in an embodiment of the present disclosure, after the server sends the obtained wireless access point information to the terminal in step 202, the method further includes determining whether the terminal has a connection permission.

Determining whether the terminal has a connection permission specifically is divided into the following several steps.

First, the server receives a connection permission application request sent by the terminal.

Then, the server determines, according to the received request, whether the terminal can be allocated a connection permission.

Then, when the server determines that the terminal can be allocated the connection permission, the server sends a permission allocation result to the terminal. Optionally, the server may store the permission allocation result that is sent to the terminal.

Optionally, in an embodiment of the present disclosure, a parameter carried in the connection permission application request includes a terminal identifier; or a user identifier; or a terminal identifier, a permission application type, and a permission value corresponding to the permission application type; or a user identifier, a permission application type, and a permission value corresponding to the permission application type. Meanings of the parameters in the four forms are the same as those in Embodiment 1, and are not repeatedly described herein.

203: When the server receives an authentication information request of a specific wireless access point from the terminal, the server sends authentication information corresponding to the specific wireless access point to the terminal, where the authentication information is used to connect the terminal to the specific wireless access point.

More specifically, when the server receives the authentication information request of the specific wireless access point from the terminal, the server selects, according to the authentication information request of the terminal, corresponding authentication information and sends the authentication information to the terminal. The authentication information may be a password, or may be a combination of "user name-password". Then, the terminal sends the received authentication information to the specific wireless access point, to apply for authentication, and if the authentication is successful, the terminal may connect to a network using the specific wireless access point.

In addition, considering that a case in which the server allocates a permission to the terminal exists before the terminal is connected to the wireless access point, correspondingly, after the terminal is connected to the specific wireless access point, a case in which the terminal consumes the permission also exists. Therefore, optionally, in an embodiment of the present disclosure, after the terminal is connected to the specific wireless access point, the following steps are further included.

2041: The server receives permission usage information sent by the terminal.

The permission usage information includes the terminal identifier and consumed permission information, or the user identifier and consumed permission information. In addition, the permission usage information may further include parameters, such as a wireless access point identifier, and authentication information (for example, a user name).

2042: The server performs processing according to a permission allocated to the terminal and the permission usage information to obtain unused permission information of the terminal.

The unused permission information is obtained by the server by performing processing according to the permission allocated to the terminal and the permission usage information. That is, the unused permission information of the terminal includes the terminal identifier and unconsumed permission information; or the user identifier and unconsumed permission information. The unconsumed permission information may be represented by a value, where the value equals to a value obtained by subtracting a value of a used permission from a value of an allocated permission. For example, the value corresponding to the permission allocated to the terminal is 1 hour, the value corresponding to the used permission is 0.8 hour, and the value corresponding to the unused permission information is 0.2 hour.

2043: The server sends the unused permission information to the terminal, where the unused permission information is used by the terminal to determine whether to keep connected to the specific wireless access point.

For example, when the permission corresponding to the terminal is already exhausted, the terminal is disconnected from the specific wireless access point.

Embodiment 2 of the present disclosure provides a WLAN access method, which is applied to a server. First, the server receives a request that is for querying an available wireless access point and sent by a terminal; then, the server obtains information about the available wireless access point according to the query request, and sends the obtained information about the available wireless access point to the terminal; then, when receiving an authentication information request of a specific wireless access point from the terminal, the server sends authentication information corresponding to the specific wireless access point to the terminal, where the authentication information is used to connect the terminal to the specific wireless access point. It can be seen from the foregoing that the terminal determines the specific wireless access point from the received wireless access point information returned by the server, and this manner avoids a problem that when the wireless access point changes, a user needs to perform a manual operation to select a wireless access point from multiple wireless access points. Therefore, this method is more intelligent and further simplifies a user operation.

In addition, before the terminal applies to the server for corresponding authentication information for connecting to the specific wireless access point, the server needs to have the authentication information of the specific wireless access point in advance. Therefore, optionally, the method further includes the following step:

Acquire wireless connection authentication information from at least one WLAN service provider.

Preferably, the wireless connection authentication information is acquired in batches. In addition, the acquiring manner may also be acquiring one by one, which is not specifically limited in the present disclosure.

Optionally, the foregoing step may be divided into the following several steps. First, send, to the at least one WLAN service provider, a request for applying for connection authentication information. After the WLAN generates and sends the connection authentication information according to the request, receive the authentication information provided by the WLAN service provider; and store the received authentication information.

The authentication information may be a password, or may be a combination of "user name-password". Using a form of "user name-password" as an example, the authentication information may be a form shown in Table 1. In this way, an available user name and password may be retrieved according to a wireless access point identifier.

TABLE 1

| Wireless access point identifier | User name | Password |
|---|---|---|
| AP1 | User1 | Vvvv |
| AP1 | User2 | Bbb |
| AP2 | User3 | Xxx |

Optionally, a request for applying to the WLAN service provider for a batch of connection authentication information carries an amount of connection authentication information that is applied for and at least one of the following parameters: an area identifier, used to identify an area to which a wireless connection point belongs; a charge rate identifier, used to identify a rate type to which the authentication information that is applied for belongs; a traffic identifier, used to identify traffic to which the authentication information that is applied for belongs; a duration identifier, used to identify duration corresponding to the authentication information that is applied for; and an amount of connection authentication information that is applied for.

Embodiment 3

Figure 4:
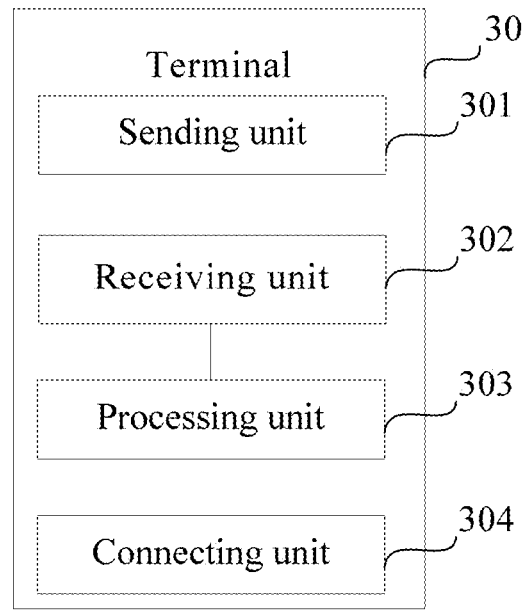
FIG. 4 is a schematic structural diagram of a terminal according to Embodiment 3 of the present disclosure.

Corresponding to Embodiment 1, Embodiment 3 of the present disclosure provides a terminal 30, as shown in FIG. 4, including a sending unit 301 configured to send a request for querying an available wireless access point to a server, to query information about the available wireless access point; a receiving unit 302 configured to receive wireless access point information returned by the server; a processing unit 303 configured to determine a specific wireless access point from the wireless access point information received by the receiving unit 302; and a connecting unit 304 configured to acquire authentication information of the specific wireless access point from the server, where the authentication information is used to connect the terminal to the specific wireless access point corresponding to the authentication information.

The request for querying the available wireless access point carries at least one of the following parameters: an area identifier, a charge rate identifier, a traffic identifier, and a duration identifier.

Embodiment 3 of the present disclosure provides a terminal 30. A sending unit 301 sends a request for querying an available wireless access point to a server, to query information about the available wireless access point; a receiving unit 302 receives wireless access point information returned by the server; a processing unit 303 determines a specific wireless access point from the wireless access point information received by the receiving unit 302; and a connecting unit 304 is configured to acquire authentication information of the specific wireless access point from the server, where the authentication information is used to connect the terminal to the specific wireless access point corresponding to the authentication information. It can be seen from the foregoing that the terminal determines the specific wireless access point from the wireless access point information returned by the server, which avoids a problem that, when the wireless access point changes, a user needs to perform a manual operation to select a wireless access point from multiple wireless access points. Therefore, the terminal is more intelligent and greatly simplifies a user operation.

Optionally, in an embodiment of the present disclosure, the processing unit 303 is configured to determine the specific wireless access point from the wireless access point information according to a preset rule, where the preset rule is one or more of the following: a signal strength, a charge rate, and available traffic.

Optionally, in an embodiment of the present disclosure, the sending unit 301 is further configured to, before the specific wireless access point is determined from the received wireless access point information, send a connection permission application request to the server, where the connection permission application request is used to request the server to determine whether the terminal has a connection permission; in a case of having the connection permission, the receiving unit 302 is further configured to receive a permission allocation result sent by the server; and that the processing unit 303 determines a specific wireless access point from the wireless access point information received by the receiving unit 302 includes determining the specific wireless access point from the wireless access point information according to the permission allocation result received by the receiving unit 302.

Further, in an embodiment of the present disclosure, the sending unit 301 is further configured to, after the terminal is connected to the specific wireless access point, send permission usage information to the server, where the permission usage information includes a terminal identifier and a value of consumed permission; or a user identifier and consumed permission information; the receiving unit 302 is further configured to receive unused permission information sent by the server, where the unused permission information is obtained by the server by performing processing according to a permission allocated to the terminal and the permission usage information; and the processing unit 303 is further configured to acquire the unused permission information sent by the server, and when the unused permission information is that the permission corresponding to the terminal is already exhausted, disconnect the terminal from the specific wireless access point.

Figure 5:
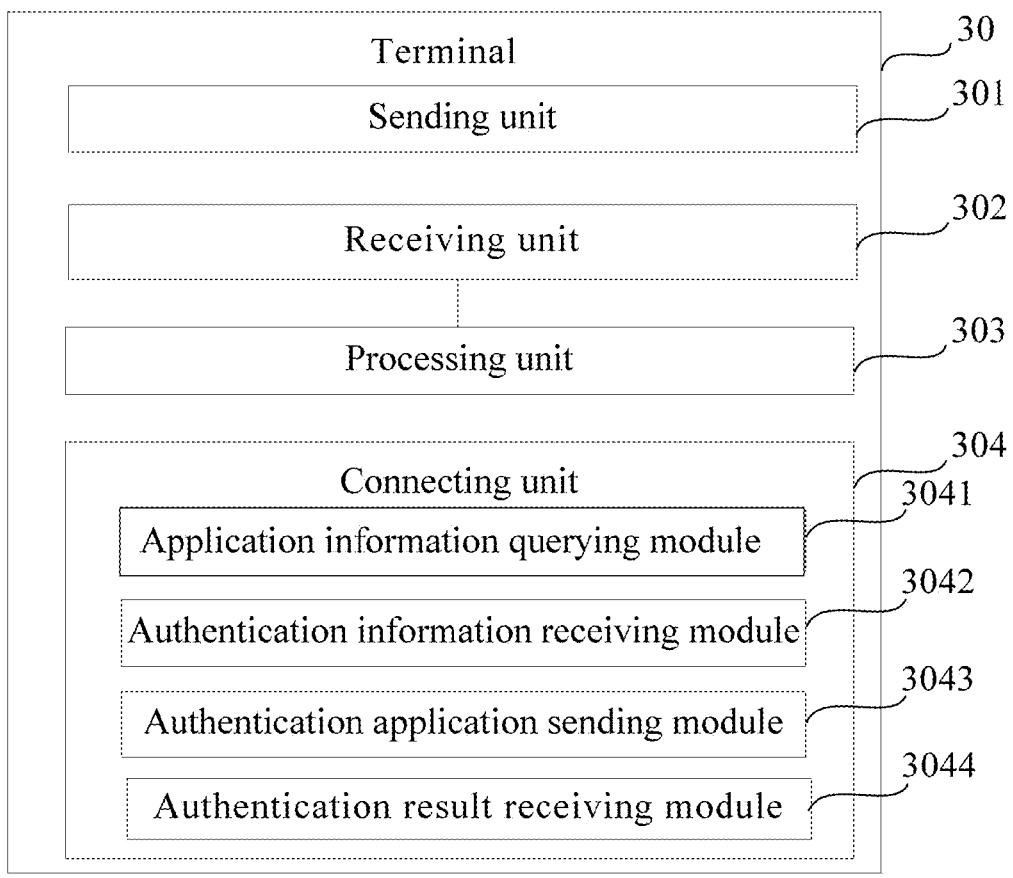
FIG. 5 is another schematic structural diagram of a terminal according to Embodiment 3 of the present disclosure.

Optionally, in an embodiment of the present disclosure, as shown in FIG. 5, the connecting unit 304 includes an authentication information querying module 3041 configured to send, to the server, an authentication information request corresponding to the specific wireless connection point; an authentication information receiving module 3042 configured to receive the authentication information that is of the specific wireless access point and sent by the server; an authentication application sending module 3043 configured to send the received authentication information to the specific wireless access point, to apply for authentication; and an authentication result receiving module 3044 configured to receive an authentication result of the authentication information from the specific wireless access point, where if the authentication result is that the authentication is successful, the terminal connects to a network using the specific wireless access point.

Embodiment 4

Figure 6:
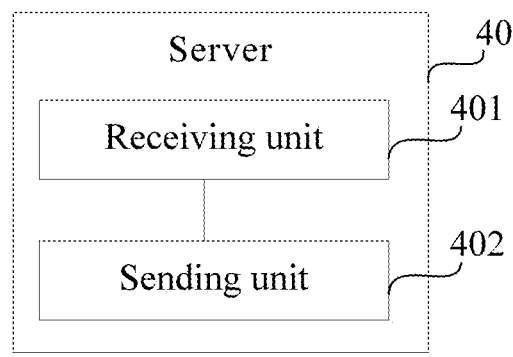
FIG. 6 is a schematic structural diagram of a server according to Embodiment 4 of the present disclosure.

Corresponding to Embodiment 2, Embodiment 4 of the present disclosure provides a server 40, as shown in FIG. 6, including a receiving unit 401 configured to receive a request that is for querying an available wireless access point and sent by a terminal; and a sending unit 402 configured to obtain information about the available wireless access point according to the query request, and send the acquired information about the wireless access point to the terminal, where, when the receiving unit 401 receives an authentication information request of a specific wireless access point from the terminal, the sending unit 402 is further configured to send authentication information corresponding to the specific wireless access point to the terminal, where the authentication information is used to connect the terminal to the specific wireless access point.

The request for querying the available wireless access point carries at least one of the following parameters: an area identifier, a charge rate identifier, a traffic identifier, and a duration identifier.

Embodiment 4 of the present disclosure provides a server 40. A receiving unit 401 receives a request that is for querying an available wireless access point and sent by a terminal; and a sending unit 402 obtains information about the available wireless access point according to the query request, and sends the acquired information about the wireless access point to the terminal. Then, when the receiving unit 401 receives an authentication information request of a specific wireless access point from the terminal, the sending unit 402 is further configured to send authentication information corresponding to the specific wireless access point to the terminal, where the authentication information is used to connect the terminal to the specific wireless access point. It can be seen from the foregoing that the server can send wireless access point information to the terminal, and can send the authentication information corresponding to the specific wireless access point to the terminal after the terminal selects the specific wireless access point, which avoids a problem that, when the wireless access point changes, a user needs to perform a manual operation to select a wireless access point from multiple wireless access points, thereby greatly simplifying a user operation.

Figure 7:
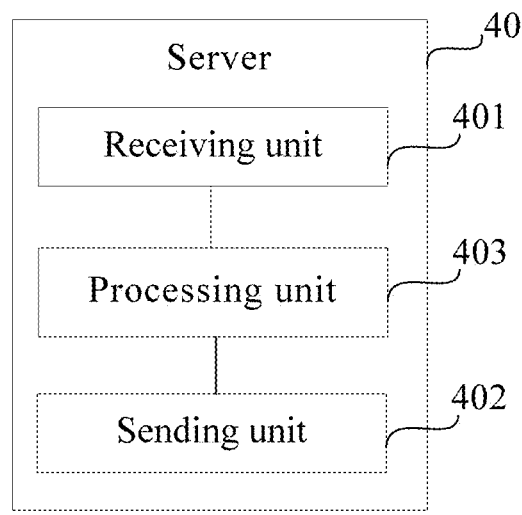
FIG. 7 is another schematic structural diagram of a server according to Embodiment 4 of the present disclosure.

Optionally, in an embodiment of the present disclosure, the receiving unit 401 is further configured to receive a connection permission application request sent by the terminal. As shown in FIG. 7, the server 40 further includes a processing unit 403 configured to determine, according to the request received by the receiving unit 401, whether the terminal can be allocated a connection permission.

In this case, the sending unit 402 is further configured to, when it is determined that the terminal can be allocated a connection permission, send a permission allocation result to the terminal.

A parameter carried in the connection permission application request includes a terminal identifier; or a user identifier; or a terminal identifier, a permission application type, and a permission value corresponding to the permission application type; or a user identifier, a permission application type, and a permission value corresponding to the permission application type.

Further, in an embodiment of the present disclosure, the receiving unit 401 is further configured to receive permission usage information sent by the terminal, where the permission usage information includes the terminal identifier and a value of consumed permission; or the user identifier and consumed permission information. The processing unit 403 is further configured to perform processing according to a permission allocated to the terminal and the permission usage information to obtain unused permission information of the terminal; and the sending unit 402 is further configured to send the unused permission information to the terminal, where the unused permission information is used by the terminal to determine whether the terminal keeps connected to the specific wireless access point.

Figure 8:
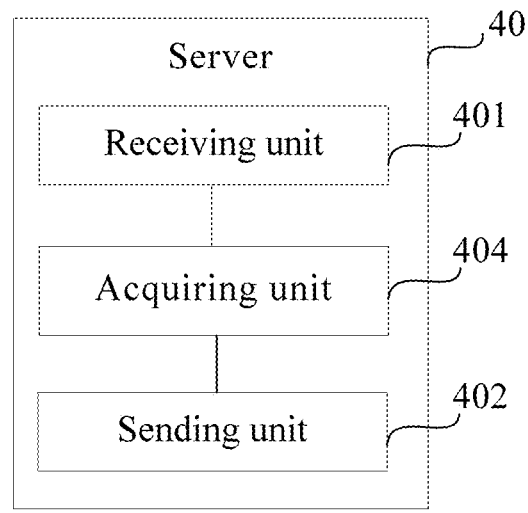
FIG. 8 is still another schematic structural diagram of a server according to Embodiment 4 of the present disclosure.

Optionally, in an embodiment of the present disclosure, as shown in FIG. 8, the server 40 further includes an acquiring unit 404 configured to acquire wireless connection authentication information from at least one WLAN service provider.

Further, in an embodiment of the present disclosure, the acquiring unit 404 is configured to send, to the at least one WLAN service provider, a request for applying for connection authentication information; after the WLAN service provider generates and sends the connection authentication information according to the request, receive the authentication information provided by the WLAN service provider; and store the received authentication information.

The request for applying for a batch of connection authentication information carries an amount of authentication information that is applied for and at least one of the following parameters: an area identifier, used to identify an area to which a wireless connection point belongs; a charge rate identifier, used to identify a rate type to which the authentication information that is applied for belongs; a traffic identifier, used to identify traffic to which the authentication information that is applied for belongs; and a duration identifier, used to identify duration corresponding to the authentication information that is applied for.

Embodiment 5

Figure 9:
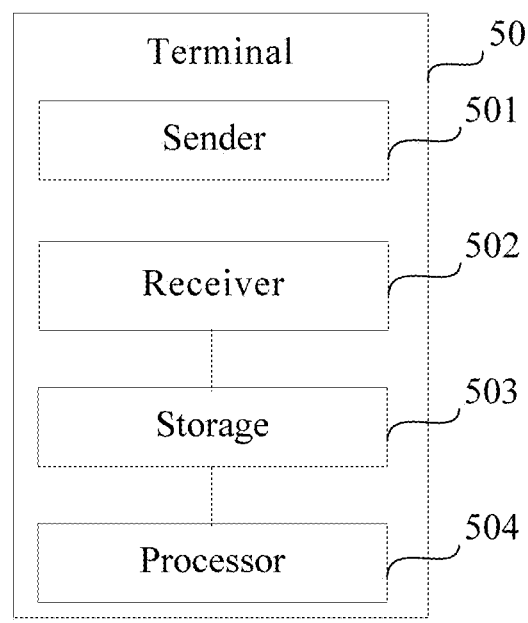
FIG. 9 is a schematic structural diagram of a terminal according to Embodiment 5 of the present disclosure.

Corresponding to Embodiment 1, Embodiment 5 of the present disclosure provides a terminal 50, as shown in FIG. 9, including a sender 501 configured to send a request for querying an available wireless access point to a server, to query information about the available wireless access point; a receiver 502 configured to receive wireless access point information returned by the server; storage 503 configured to store the wireless access point information received by the receiver 502; and a processor 504 configured to determine a specific wireless access point from the wireless access point information stored in the storage 503, where the processor 504 is further configured to acquire authentication information of the specific wireless access point from the server, where the authentication information is used to connect the terminal to the specific wireless access point corresponding to the authentication information.

The storage 503 includes persistent storage and non-persistent storage. The persistent storage may be a hard disk, a Secure Digital (SD) card, or the like, and is configured to store an operating system, a browser engine, a management module client, a user identification module, and other application programs. The non-persistent storage may be a memory. When a program runs, the program needs to be loaded from the persistent storage to the memory, and the memory further stores temporary data produced in a running process of the program.

The processor 504 is configured to execute an instruction and complete an operation (for example, using an instruction acquired from the storage) related to a mobile terminal system, and the processor 504 may control receiving and manipulation of data that is input and manipulation of data that is output between components of the mobile terminal system; and the processor 504 may be implemented by a chip, a multi-chip or multiple electronic components, and may use a variety of system architectures, including a dedicated or embedded processor, a dedicated processor, a controller, an application-specific integrated circuit (ASIC), and the like.

In addition, the terminal 50 further includes an input/output device, which is used for human computer interaction. A user may send a control instruction to a mobile terminal using the input device. For example, the input device may be a keyboard, a touchscreen, or the like. The user may receive a processing result and feedback information of the mobile terminal using the output device. For example, the output device may be a display.

Embodiment 5 of the present disclosure provides a terminal 50. A sender 501 sends a request for querying an available wireless access point to a server, to query information about the available wireless access point; a receiver 502 receives wireless access point information returned by the server; and a processor 504 determines a specific wireless access point from the wireless access point information stored in storage 503, and acquires authentication information of the specific wireless access point from the server, where the authentication information is used to connect the terminal to the specific wireless access point corresponding to the authentication information. It can be seen from the foregoing that the terminal determines the specific wireless access point from the wireless access point information returned by the server, which avoids a problem that, when the wireless access point changes, a user needs to perform a manual operation to select a wireless access point from multiple wireless access points. Therefore, the terminal is more intelligent and greatly simplifies a user operation.

Optionally, in an embodiment of the present disclosure, the processor 504 is configured to determine the specific wireless access point from the wireless access point information according to a preset rule, where the preset rule is one or more of the following: a signal strength, a charge rate, and available traffic.

Optionally, in an embodiment of the present disclosure, the sender 501 is further configured to, before the processor 504 determines the specific wireless access point according to the wireless access point information, send a connection permission application request to the server, where the connection permission application request is used to request the server to determine whether the terminal has a connection permission; in a case of having the connection permission, the receiver 502 is further configured to receive a permission allocation result sent by the server; and that the processor 504 determines a specific wireless access point from the wireless access point information stored in the storage 503 includes that the processor 504 determines, according to the received permission allocation result, the specific wireless access point from the wireless access point information stored in the storage 503.

Optionally, in an embodiment of the present disclosure, the sender 501 is further configured to send permission usage information to the server, where the permission usage information includes a terminal identifier and a value of consumed permission; or a user identifier and consumed permission information; the receiver 502 is further configured to receive unused permission information sent by the server, where the unused permission information is obtained by the server by performing processing according to a permission allocated to the terminal and the permission usage information; and the processor 504 is further configured to acquire the unused permission information sent by the server, and when the unused permission information is that the permission corresponding to the terminal is already exhausted, disconnect the terminal from the specific wireless access point.

Optionally, in an embodiment of the present disclosure, the sender 501 is further configured to send, to the server, an authentication information request corresponding to the specific wireless connection point; the receiver 502 is further configured to, after the server selects corresponding authentication information according to an application and sends the authentication information according to the application, receive the authentication information that is of the specific wireless access point and sent by the server; the sender 501 is further configured to send the authentication information received by the receiver 502 to the specific wireless access point, to apply for authentication; and the receiver 502 is further configured to receive an authentication result of the authentication information from the specific wireless access point, where if the authentication result is that the authentication is successful, the terminal connects to a network using the specific wireless access point.

Embodiment 6

Figure 10:
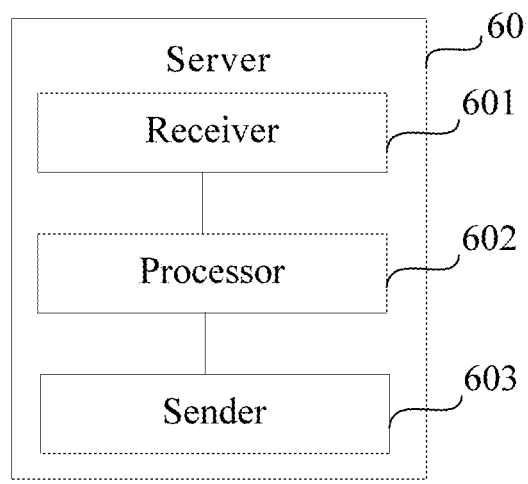
FIG. 10 is a schematic structural diagram of a server according to Embodiment 6 of the present disclosure.

Corresponding to Embodiment 2, Embodiment 6 of the present disclosure provides a server 60, as shown in FIG. 10, including a receiver 601 configured to receive a request that is for querying an available wireless access point and sent by a terminal; a processor 602 configured to obtain information about the available wireless access point according to the query request; and a sender 603 configured to send the acquired information about the wireless access point to the terminal, where the sender 603 is further configured to, when the receiver 601 receives an authentication information request of a specific wireless access point from the terminal, send authentication information corresponding to the specific wireless access point to the terminal, where the authentication information is used to connect the terminal to the specific wireless access point.

The processor 602 is configured to execute an instruction and complete an operation (for example, using an instruction acquired from storage) related to a mobile terminal system, and the processor 602 may control receiving and manipulation of data that is input and output between components of the mobile terminal system; and the processor 602 may be implemented by a chip, a multi-chip or multiple electronic components, and may use a variety of system architectures, including a dedicated or embedded processor, a dedicated processor, a controller, an ASIC, and the like.

Embodiment 6 of the present disclosure provides a server 60. A receiver 601 receives a request that is for querying an available wireless access point and sent by a terminal; a processor 602 obtains information about the available wireless access point according to the query request; a sender 603 sends the acquired information about the wireless access point to the terminal; then, when the receiver 601 receives an authentication information request of a specific wireless access point from the terminal, the sender 603 sends authentication information corresponding to the specific wireless access point to the terminal, where the authentication information is used to connect the terminal to the specific wireless access point. It can be seen from the foregoing that the server can send wireless access point information to the terminal, and can send the authentication information corresponding to the specific wireless access point to the terminal after the terminal selects the specific wireless access point, which avoids a problem that, when the wireless access point changes, a user needs to perform a manual operation to select a wireless access point from multiple wireless access points, thereby greatly simplifying a user operation.

Optionally, in an embodiment of the present disclosure, after the sender 603 sends the acquired information about the wireless access point to the terminal, the receiver 601 is further configured to receive a connection permission application request sent by the terminal.

The processor 602 is further configured to determine, according to the request received by the receiver 601, whether the terminal can be allocated a connection permission.

The sender 603 is further configured to, when the processor 602 determines that the terminal can be allocated a connection permission, send a permission allocation result to the terminal.

Further, in an embodiment of the present disclosure, the receiver 601 is further configured to receive permission usage information sent by the terminal, where the permission usage information includes a terminal identifier and a value of consumed permission; or a user identifier and consumed permission information.

The processor 602 is further configured to perform processing according to a permission allocated to the terminal and the permission usage information to obtain unused permission information of the terminal.

The sender 603 is further configured to send the unused permission information to the terminal, where the unused permission information is used by the terminal to determine whether the terminal keeps connected to the specific wireless access point.

Optionally, in an embodiment of the present disclosure, the processor 602 is further configured to acquire wireless connection authentication information from at least one WLAN service provider.

Further, in an embodiment of the present disclosure, the processor 602 is configured to send, by the processor 602, an instruction to the sender 603, to instruct the sender 603 to send, to the at least one WLAN service provider, a request for applying for connection authentication information; and send, by the processor 602, an instruction to the receiver 601, to instruct the receiver 601 to receive, after the WLAN service provider generates and sends the connection authentication information according to the request, the authentication information provided by the WLAN service provider.

Figure 11:
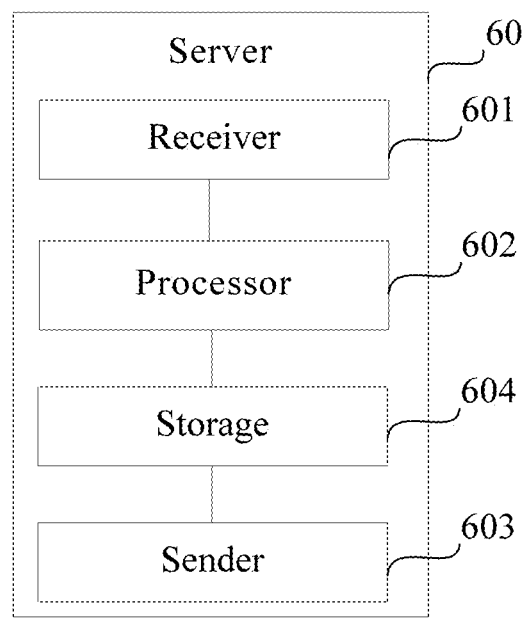
FIG. 11 is another schematic structural diagram of a server according to Embodiment 6 of the present disclosure.

In this case, as shown in FIG. 11, the server 60 further includes storage 604 configured to store the authentication information received by the receiver 601.

The storage 604 includes persistent storage and non-persistent storage. The persistent storage may be a hard disk, an SD card, or the like, and is configured to store an operating system, a browser engine, a management module client, a user identification module, and other application programs. The non-persistent storage may be a memory. When a program runs, the program needs to be loaded from the persistent storage to the memory, and the memory further stores temporary data produced in a running process of the program.

Embodiment 7

Figure 12:
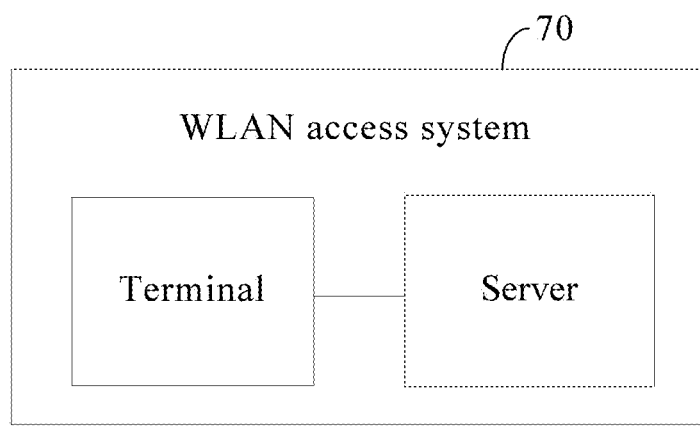
FIG. 12 is a schematic diagram of a system architecture of a WLAN access system according to Embodiment 7 of the present disclosure.

In addition, Embodiment 7 of the present disclosure further provides a WLAN access system 70. As shown in FIG. 12, the system includes the terminal described in Embodiment 3 of the present disclosure and the server described in Embodiment 4 of the present disclosure; or the system includes the terminal described in Embodiment 5 of the present disclosure and the server described in Embodiment 6 of the present disclosure.

A person of ordinary skill in the art may understand that all or a part of the steps of the methods in the embodiments may be implemented by a program instructing related hardware. The program may be stored in a computer readable storage medium. The storage medium may include a read-only memory, a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A wireless local area network (WLAN) access method, comprising:
    sending, by a terminal, a first request to a server for a wireless access point, wherein the wireless access point is able to be accessed by the terminal to connect to a network;
    receiving, by the terminal, a list of wireless access points from the server, wherein the list of wireless access points are to be accessed from the server, and wherein the list of wireless access points comprises at least one wireless access point that is to be accessed by the terminal;
    determining, by the terminal, a specific wireless access point from the list of wireless access points, wherein the specific wireless access point is used by the terminal to connect to the network;
    sending, by the terminal, a second request to the server for authentication information of the specific wireless access point;
    receiving, by the terminal, the authentication information of the specific wireless access point from the server;
    accessing, by the terminal, the specific wireless access point using the authentication information;
    sending permission usage information to the server, wherein the permission usage information comprises consumed permission information and either the terminal identifier or the user identifier;
    receiving unused permission information from the server, wherein the unused permission information is obtained according to a permission allocated to the terminal and the permission usage information; and
    disconnecting the terminal from the specific wireless access point when the unused permission information signifies that the permission corresponding to the terminal has been exhausted.

2. The WLAN access method of claim 1, wherein the first request comprises parameters related to at least one of an area identifier, a charge rate identifier, a traffic identifier, or a duration identifier.

3. The WLAN access method of claim 1, wherein determining the specific wireless access point from the list of wireless access points comprises determining the specific wireless access point according to a preset rule, wherein the preset rule is one or more of a signal strength, a charge rate, and available traffic.

4. The WLAN access method of claim 1, wherein before determining the specific wireless access point from the list of wireless access points, the method further comprises:

sending a connection permission application request to the server, wherein the connection permission application request is used to request the server to determine whether the terminal has a connection permission;

receiving a permission allocation result from the server, in a case of having the connection permission; and determining the specific wireless access point from the list of wireless access points according to the permission allocation result.

5. The WLAN access method of claim 4, wherein the connection permission application request comprises at least one of:

a terminal identifier;

a user identifier;

each of the terminal identifier, a permission application type, and a permission value corresponding to the permission application type; or each of the user identifier, the permission application type, and the permission value corresponding to the permission application type.

6. The WLAN access method of claim 1, wherein receiving the authentication information of the specific wireless access point from the server comprises:

sending an authentication information request of the specific wireless access point to the server;

receiving the authentication information corresponding to the specific wireless access point from the server;

sending the received authentication information to the specific wireless access point, to apply for authentication;

receiving an authentication result from the specific wireless access point; and connecting the terminal to the network using the specific wireless access point when the authentication result is that the authentication is successful.

7. A terminal, comprising:

a memory comprising instructions; and a computer processor coupled to the memory, wherein the instructions are executed by the computer processor to cause the terminal to:

send a first request to a server for a wireless access point, wherein the wireless access point is able to be accessed by the terminal to connect to a network;

receive a list of wireless access points from the server, wherein the list of wireless access points are to be accessed from the server, and wherein the list of wireless access points comprises at least one wireless access point that is to be accessed by the terminal;

determine a specific wireless access point from the list of wireless access points, wherein the specific wireless access point is used by the terminal to connect to the network;

send a second request to the server for authentication information of the specific wireless access point;

receive the authentication information of the specific wireless access point from the server;

access the specific wireless access point using the authentication information;

send permission usage information to the server, wherein the permission usage information comprises consumed permission information and either the terminal identifier information or the user identifier;

receive unused permission information from the server, wherein the unused permission information is obtained according to a permission allocated to the terminal and the permission usage information; and disconnect the terminal from the specific wireless access point when the unused permission information signifies that the permission corresponding to the terminal has been exhausted.

8. The terminal according to claim 7, wherein the first request comprises parameters related to at least one of an area identifier, a charge rate identifier, a traffic identifier, or a duration identifier.

9. The terminal according to claim 7, wherein the instructions further cause the terminal to determine the specific wireless access point according to a preset rule, wherein the preset rule is one or more of a signal strength, a charge rate, and available traffic.

10. The terminal according to claim 7, wherein the instructions further cause the terminal to:

send a connection permission application request to the server, wherein the connection permission application request is used to request the server to determine whether the terminal has a connection permission;

receive a permission allocation result from the server, in a case of having the connection permission; and determine the specific wireless access point from the list of wireless access points according to the permission allocation result.

11. The terminal according to claim 10, wherein the connection permission application request comprises at least one of:

a terminal identifier;

a user identifier;

each of the terminal identifier, a permission application type, and a permission value corresponding to the permission application type; or each of the user identifier, the permission application type, and the permission value corresponding to the permission application type.

12. The terminal according to claim 7, wherein the instructions further cause the terminal to:

send an authentication information request of the specific wireless access point to the server;

receive the authentication information corresponding to the specific wireless access point from the server;

send the received authentication information to the specific wireless access point, to apply for authentication;

receive an authentication result from the specific wireless access point; and connect the terminal to the network using the specific wireless access point when the authentication result is that the authentication is successful.

13. A server, comprising:

a memory comprising instructions; and a computer processor coupled to the memory, wherein the instructions are executed by the computer processor to cause the server to:

receive, from a terminal, a first request for a wireless access point, wherein the wireless access point is able to be accessed by the terminal to connect to a network;

send, to the terminal, a list of wireless access points that are to be accessed by the terminal, wherein the list of wireless access points comprises at least one wireless access point that is to be accessed by the terminal;

receive, from the terminal, a second request for authentication information of a specific wireless access point from the list of wireless access points, wherein the specific wireless access point is used by the terminal to connect to the network;

send, to the terminal, the authentication information of the specific wireless access point, wherein the authentication information is used to access the specific wireless access point;

receive, from the terminal, permission usage information, wherein the permission usage information comprises consumed permission information and either a terminal identifier or a user identifier; and send, to the terminal, unused permission information, wherein the unused permission information is obtained according to a permission allocated to the terminal and the permission usage information, and wherein the unused permission information signifies that the permission corresponding to the terminal has been exhausted.

14. The server according to claim 13, wherein the first request comprises parameters related to at least one of an area identifier, a charge rate identifier, a traffic identifier, or a duration identifier.

15. The server according to claim 13, wherein the instructions further cause the server to send the list of wireless access points according to a preset rule, wherein the preset rule is one or more of a signal strength, a charge rate, and available traffic.

16. The server according to claim 13, wherein the instructions further cause the server to:

receive, from the terminal, a connection permission application request, wherein the connection permission application request is used by the server to determine whether the terminal has a connection permission;

send, to the terminal, a permission allocation result in a case the terminal has the connection permission; and receive, from the terminal, the second request for the authentication information of the specific wireless access point from the list of wireless access points according to the permission allocation result.

17. The server according to claim 13, wherein the instructions further cause the server to:

receive, from the terminal, an authentication information request of the specific wireless access point; and send, to the terminal, the authentication information corresponding to the specific wireless access point, wherein the authentication information corresponds to the specific wireless access point being used by the terminal to connect the terminal to the network using the specific wireless access point.

* * * * *